L. W. FREDERICK.
DRAFT-EQUALIZER.
No. 191,041. Patented May 22, 1877.
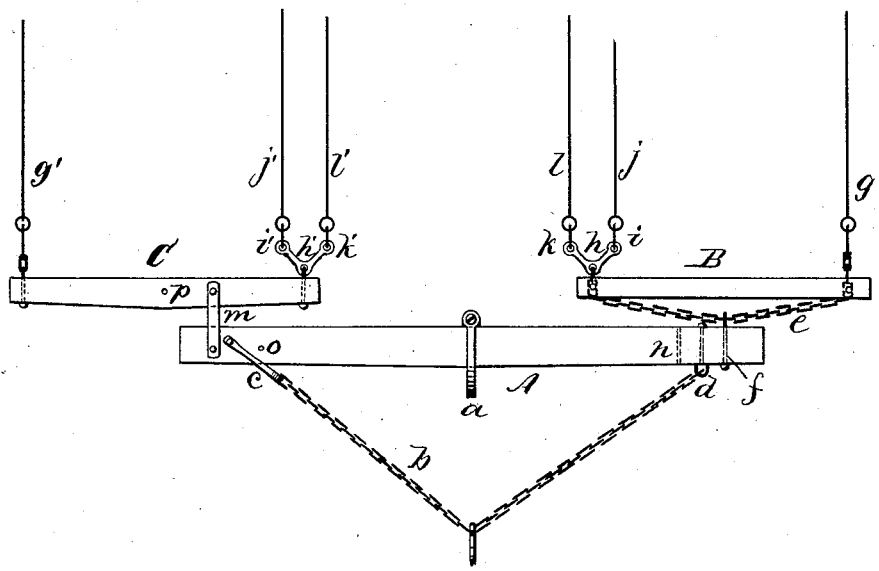
WITNESSES:
INVENTOR:
L. W. Frederick
BY
ATTORNEYS.

UNITED STATES PATENT OFFICE.

LEVI W. FREDERICK, OF HALL, INDIANA.

IMPROVEMENT IN DRAFT-EQUALIZERS.

Specification forming part of Letters Patent No. 191,041, dated May 22, 1877; application filed February 26, 1877.

*To all whom it may concern:*

Be it known that I, LEVI W. FREDERICK, of Hall, in the county of Morgan, and State of Indiana, have invented a new and Improved Evener, of which the following is a specification:

The object of my invention is to provide a simple and effective evener that may be used for two or more horses.

Referring to the drawing, A is the main bar of the evener, which is attached to the object to be drawn by a clevis, $a$, in the usual way. A guard-chain, $b$, is attached to the main bar A by a clevis, $c$, at one of its ends and by an eyebolt, $d$, at the other end.

B is a whiffletree having the chain $e$ attached to it at each end. A hook-bolt, $f$, passes through the main bar A, and engages the chain $e$. By shifting this chain in the hook-bolt $f$ the leverage of the whiffletree may be changed. A trace, $g$, is connected with the whiffletree B at its outer end in the usual way, and a right-angled lever, $h$, having equal arms, is pivoted to the inner end of the whiffletree. To the arm $i$ of this lever the trace $j$ is attached, and to the arm $k$ the trace $l$ is attached.

C is a whiffletree connected with the main bar A by a strap, $m$, and having attached to its outer end the trace $g'$, and to its inner end the lever $h'$, which is like the lever $h$. To the arm $i'$ of this lever the trace $j$ is attached, and the trace $l'$ is attached to the arm $k'$.

The evener, when arranged as shown in the drawing, receives three horses, the center one being hitched to the traces $l\ l'$, and the outside ones respectively to the traces $j\ g$ and $j'\ g'$. It will be seen that one-half of the power of the center horse will be exerted on the inner ends of the whiffletrees C B, in addition to the force exerted by the outside horses.

To compensate for the difference in strain upon the inner and outer ends of the whiffletrees the inner end is made shortest, as shown in the drawing.

When it is desired to use the evener for two horses, the hook-bolt $f$ is shifted into the hole $n$ in the bar A, and at the same time it is placed in the center of the chain $e$; the straps $m$ are changed to the hole O in the main bar A, and also to the central hole $p$ in the whiffletree C. The inner traces $l\ l'$ being removed, the arms $i\ i'$ of the levers $h\ h'$ will draw directly from the pivot of the lever, acting as a simple link for connecting the trace and whiffletree. Either the chain $e$ or straps $m$ may be used for connecting the whiffletrees and the main bar A.

The advantages claimed for my improved evener are that it can be readily adjusted to distribute the load evenly between the horses, it permits of the easy movement of each horse, and it may readily be shifted to accommodate the required number of horses.

Having thus described my invention, I claim as new and desire to secure by Letters Patent—

The combination of the whiffletree B, chain $e$, hook-bolt $f$, and main bar A, substantially as herein shown and described.

LEVI WHITAKER FREDERICK.

Witnesses:
JAMES H. BUNN,
JAMES A. LONG.